Nov. 5, 1946.      H. L. COOK      2,410,716
AIR AND FLUID PRESSURE CUSHION DEVICE
Filed June 11, 1945
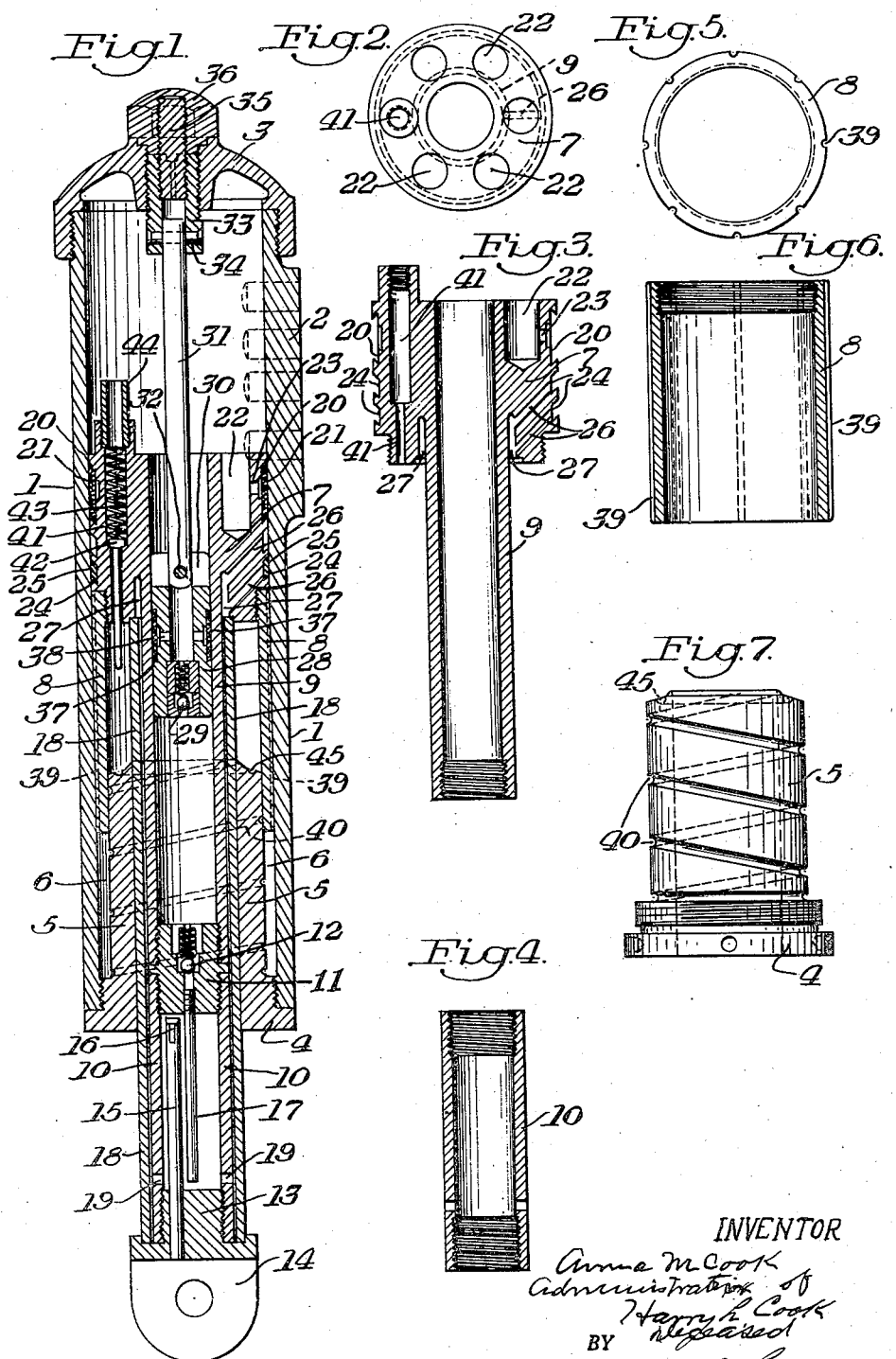

Patented Nov. 5, 1946

2,410,716

UNITED STATES PATENT OFFICE 2,410,716

AIR AND FLUID PRESSURE CUSHION DEVICE

Harry L. Cook, deceased, late of North Huntingdon Township, Westmoreland County, Pa., by Anna M. Cook, administratrix, North Huntingdon Township, Westmoreland County, Pa.

Application June 11, 1945, Serial No. 598,733

5 Claims. (Cl. 188—88)

The invention consists in certain new and useful improvements in fluid pressure cushioning devices used for the support of the bodies of passenger automobiles, motor trucks, trailers and other vehicles, for cushioning the landing gear of aircraft, and for other like purposes.

The principal object in view is the provision of a more efficient, rugged and durable device for such purposes which will automatically accommodate itself to either gradual or sudden increases or decreases in the imposed load in the case of vehicles, and in the case of aircraft will effectually cushion the impact on the wheels of the landing gear in landing and in taxiing over rough surfaces, thus preventing injury to the wheel tires and landing gear.

Other objects in view will appear from the following description.

For such purposes the present invention includes a new and improved cushioning device comprising the following characteristics.

There is provided a cylindrical casing which is attached to one portion of the vehicle, preferably the body, and in the case of aircraft to the upper portion of the landing gear.

One end of the casing is closed by a removable cap while its other end is provided with a removable head having a central bore and an inwardly projecting annular extension of such diameter as to provide an annular chamber between the extension and the casing.

Within the casing works the main piston having a central bore and a tubular skirt which has a sliding fit within the casing and extends into the annular chamber between the casing and the extension of the head. The main piston is also provided with a tubular piston rod which extends through the bore of the head and is connected to an opposed portion of the vehicle, such as the chassis or a leaf spring carried by the chassis, or in the case of an aircraft to the lower portion or wheel-mounting of the landing gear.

Working within the bore of the main piston and its tubular piston rod is a pump piston, and the latter and the tubular piston rod are provided with valvular means for drawing atmospheric air into the tubular piston rod as the pump piston moves upwardly or inwardly thereof, and for compressing such air and introducing it into the main chamber which is formed in the upper or cap end of the casing by the main piston.

The pump piston is connected by a link to the cap closing one end of the casing, such link being provided with pivotal connections at its ends with the cap and with the pump piston which are so disposed as to assume torque.

Means are provided for the relief of excess pressure in the main chamber by means of a relief valve which opens when the main piston approaches the head to a predetermined degree.

Novel packing means are provided between the main piston and the internal wall of the casing and for lubricating the sliding contact between the same. Also novel means are provided for lubricating the pump piston and other parts in sliding contact.

Other novel features of construction and arrangement of parts will appear in the following description.

In the accompanying drawing which illustrates a practical embodiment of the principles of the invention, Fig. 1 is a longitudinal section of the cushioning device;

Fig. 2 is a top plan view of the main piston;

Fig. 3 is a longitudinal section of the main piston taken on the same plane as in Fig. 1;

Fig. 4 is a longitudinal section of the bottom section of the tubular piston rod;

Fig. 5 is a top plan view of the main piston skirt;

Fig. 6 is a longitudinal section of the main piston skirt; and

Fig. 7 is a side view of the head.

Referring to the drawing, I indicates a cylindrical casing provided with means for attaching it to the vehicle body or other main element which is to be connected in cushioned relation to a second main element. Thus the casing is shown provided at its side with a flattened enlargement 2 provided with threaded holes for the application of attaching bolts or screws.

One end of the case 1, the upper end as illustrated in Fig. 1, is closed by a domed screw cap 3, and 4 indicates a head having a cylindrical threaded portion arranged to be screwed into the other end of the casing, said head provided with a perimetral portion which overlaps and bears inwardly against the extremity of the casing.

The head 4 is provided further with an annular extension 5 extending inwardly of the casing and of such diameter as to form between it and the wall of the casing an annular chamber 6 of sufficient radial width to slidably receive the main piston skirt hereinafter described.

7 indicates the main piston working in the casing and having a sliding fit therein, and 8 indicates a tubular skirt secured to and extending from the piston and coaxially therewith in the direction of the head 4 and moving in the chamber 6, thus aiding in preventing misalignment between the casing and the main piston and its piston rod.

The main piston 7 is provided with an axial bore and 9 indicates a tubular piston rod connected to the piston and extending outwardly through the bore of the head 4, the bore of the piston rod being continuous with the bore of the piston proper. In the drawing the inner portion of the piston rod is shown formed, as by casting, integral with the piston 7 but it may be a separate piece attached to the piston. Thus 9 indicates the upper or inner section of the tubular piston rod, and 10 indicates the lower or outer piston rod section which is axially aligned with the section 9 and is rigidly attached thereto by the casing 11 of the inwardly opening check valve 12, the extremities of such casing being tubular and exteriorly threaded to be screwed into the adjacent ends of the two sections.

The assembled piston rod is of sufficient length to protrude through the axial bore of the head 4, and the outer extremity of the section 10 is internally threaded so that it may be screwed down over the threaded boss 13 extending from the bridge of the shackle 14.

The shackle is intended for attachment to the eye of a leaf spring carried by the chassis of a vehicle or to a portion of the landing gear of an aircraft, but any suitable means for connecting the main piston rod to one of a pair of elements, to be associated in cushioned relation, may be adopted.

15 indicates an air inlet tube stepped in a port extending through the boss 13 and the bridge of shackle 14, for the admission of atmospheric air into the cushion device. The tube extends upwardly within the piston rod section 10 to a degree sufficient to prevent its upper end from becoming submerged in the pool of oil accumulating in the lower end of the tubular piston rod. The inner or upper end of the inlet tube 15 is provided with an upwardly opening check valve 16 to permit the inward admission of atmospheric air under conditions of low pressure in the lower section of the piston rod and prevent its outward escape in the presence of higher pressure.

17 indicates a penstock tube depending within the piston rod section 10 and having its upper end screwed into the lower port of the valve casing 11. The tube 17 extends well down into the lower end portion of the piston rod section 10 so as to be normally immersed in the oil pool.

18 indicates a tubular sleeve which surrounds the main piston rod and is stepped at its inner end in an annular concentric recess in the piston 7, and at its lower end in a circular depression in the bridge of the shackle 14 concentric with the boss 13. The sleeve has a sliding fit with the inner wall surface of the bore of the extension 5 and of the head 4.

Adjacent its lower or outer end the piston rod section 10 is provided with radial ports 19 so that oil moving between the surfaces of the sleeve 18 and the piston rod may enter the lower end of the piston rod and form a pool therein.

The perimetral wall of the main piston 7 is provided with an annular seat 20 extending circumferentially thereof and preferably having undercut walls. 21 indicates a band of flexible packing material mounted in said seat. 22 indicates a plurality of holes sunk downwardly in the piston 7 forming wells which are to be filled with grease and whose lower ends are connected by radial ports 23 with a circumferential groove cut in the inner wall of the packing seat 20. Thus the pressure in the casing above the main piston tends to feed grease to the flexible packing 21, thus keeping it flexible and lubricated, and pressing it outwardly into snug relation with the inner wall surface of the casing.

Below the packing 21 and its seat 20 the main piston is provided with one or more circumferentially disposed seats 24 in which are mounted the cast iron packing rings 25.

26 indicates inwardly and downwardly extending ports in the main piston 7 leading from the piston ring seats 24 to the annular concentric recess 27 in the lower portion of the piston and which is open at its bottom to permit the oil taken up by the piston rings to travel down between the piston rod sections 9 and 10 and flow through the radial ports 19 to form a pool in the lower end of the section 10.

28 indicates the pump piston working in the bore of the main piston 7 and the piston rod section 9. The pump piston is provided with a central bore in the lower portion of which is mounted the upwardly opening check valve 29. At diametrically disposed points the wall of the upper portion of the tubular pump piston 28 is cut away radially as at 30 to provide clearance for the lower end of the piston link 31 which is pivotally attached to the pump piston by the wrist pin 32. The upper end of the link 31 is received in the bore of the tubular link-guide 33 and pivotally connected thereto by the wrist pin 34 disposed in a plane at right angles to that of the wrist pin 32, the wall of the guide being cut away at diametrically opposed points to permit a swinging movement of the link.

The tubular link guide 33 is exteriorly threaded and is screwed upwardly into a threaded hole extending axially of and through the cap 3.

The upper bore of the guide is threaded and 35 indicates a threaded stud screwed down into the guide and protruding above the cap 3. 36 indicates a sealing nut screwed down on the upper end of the stud tightly against the cap.

It is evident that the link-connection between the piston valve and the cap closing the upper end of the casing 1 is such that as the main piston works upwardly and downwardly relative to the casing 1, the pump valve moves up and down in the main piston 7 and the piston rod section 9. Moreover the flexible link connection between the pump piston and the cap prevents torque which may arise from any misalignment between the casing and the main piston from becoming effective on the movement of the pump piston.

The pump piston 28 is provided with a circumferential packing seat in which is mounted the flexible packing 37, and radial ports 38 in the wall of the pump piston feed oil under pressure to the inner surface of the pump packing to render the same flexible and lubricated.

For the purpose of facilitating the travel of oil down between the tubular skirt 8 and the casing 1 the inner wall of the latter is provided with longitudinal groove 39, as shown in Fig. 6.

To facilitate the travel of oil between the exterior wall of the extension 5 and the interior wall of the main piston skirt 8, the wall of the extension is provided with the helical groove or grooves 40.

The main piston 7 is provided with a port 41 cut vertically through the same at one side of the bore of the piston, the upper diameter of the port being greater than that of the lower portion thereof, forming an annular internal shoulder upon which seats a poppet valve 42 the stem of which extends down through the port with a loose fit and protrudes below the same. The valve is normally held seated by a helical spring 43 mounted in the upper portion of the port and held in position by the lower end of a short tube 44 having its lower end screwed into the upper tubular extension of the port 41.

When the main piston 7 is caused to suddenly move downwardly in the casing 1 to an abnormal degree, as, for instance in case the vehicle wheel strikes an obstacle or drops suddenly into a relatively deep hole, or the wheels of the landing gear of an airplane, landing at high speed, strike the ground with great force, the valve stem strikes the top edge of the extension 5, forcing the poppet valve open and allowing air to escape down into the chamber 6 to cushion the downward movement and aid in stabilizing the main piston relative to the casing.

To receive the impact of the valve stem the top edge of the extension 5 is provided with an annular groove 45 and the adjacent wall inclined to direct the lower end of the valve stem toward the groove.

For convenience in describing the operation of the cushioning device in service, the space between the upper end of the casing and the main piston is termed the "main chamber" and the space in the tubular piston rod between the check valve 12 and the pump piston as the "pressure chamber."

As the main piston descends in the main chamber, the pump piston ascends in the tubular piston rod enlarging the area of the pressure chamber and sucking in atmospheric air into the latter through the tube 15, the check valve 16, the penstock 17 and the check valve 12. As the main piston ascends in the main chamber, thus increasing the pressure in the latter, the pump piston descends and reduces the area in the pressure chamber, closing the check valves above referred to and compressing the air trapped above the valve 12. If the pressure thus built up in the pressure chamber exceeds that at the time present in the main chamber, the check valve 29 in the pump piston opens and the pressure is increased in the main chamber. As this reciprocation proceeds the pressure in the main chamber and that in the pressure chamber becomes equalized.

There is a gradual leakage of air from the main chamber past the main piston and between the piston skirt 8 and the wall of the casing, escaping between the head 4 and the lower end of the casing. Such a leakage tends to reduce the pressure in the main chamber. In such case the reciprocation will be temporarily resumed and the pumping action will again restore balancing pressure in the main chamber.

Should the wheel of the vehicle strike an obstruction in the roadway or drop into a deep hole, a relatively violent reciprocation will ensue, building up pressure in the main chamber in excess of that required to normally balance the load.

In such case the abnormal descent of the piston in the main chamber will cause the stem of the poppet valve 42 to strike the top edge of the extension 5 of the head 4, opening the valve and relieving the excess pressure. The top of the tube 44 is of such elevation above the main piston that oil from the pool maintained above the main piston will not escape through the open poppet valve.

Sufficient oil to form such a pool is maintained in the cushion device. Most of the oil in the pool will be prevented from escape past the piston by the flexible packing 21, which is not only kept flexible by the grease forced against its inner surface from the wells 22 by the pressure in the main chamber but is forced outwardly into snug contact with the wall of the casing. However some will escape and will be largely picked up by the piston rings 25 and directed inwardly and down between the sleeve 18 and the tubular piston rod to collect in a pool around the air inlet tube 15 and the penstock 17. Any oil which may be picked up by the piston rings will pass down the outside of the skirt 8 to the chamber 6 where it will lubricate the sliding joint between the skirt and the extension, the groove 40 acting to distribuate the oil.

The oil from the pool in the lower end of the tubular piston rod will be sucked up as spray through the piston rod, lubricating the check valves and be eventually restored to the pool on top of the main piston. The oil standing in the bore of the main piston will lubricate packing of the pump piston, the pressure forcing the oil through the ports 38.

What is claimed is:

1. In a cushioning device for the purposes described, the combination of a main casing arranged to be attached to one of the two elements between which the cushioning device is to be operatively interposed, a cap closing one end of the casing, a detachable head closing the other end of the casing, said head having an axial bore and an annular extension protruding inwardly of the casing and forming with the wall of the casing an annular chamber, a main piston working in the casing and provided with an axial bore and a tubular piston rod extending outwardly through the bore of the head, the outer end of the tubular piston rod being arranged for attachment to the other of said elements, a pump piston working in the bore of the main piston and linked to the cap, valve means for the admission of atmospheric air into the tubular piston rod as the pump piston moves towards the head, said valve means closing as the piston moves in the opposite direction to compress the trapped air and admit to the chamber formed in the cap end of the casing by the main piston, and a cylindrical skirt depending from the main piston and working in the annular chamber.

2. The structure of claim 1 characterized by the provision of a poppet valve in the main piston the stem of which impinges against the annular extension of the head and causes the valve to open and relieve a sudden occurrence of excess fluid pressure in the cap end of the casing.

3. In a cushioning device for the purposes described, the combination of a cylindrical casing arranged to be attached to one of the two elements between which the cushioning device is to be operatively interposed, a cap closing one end of the casing, a detachable head closing the other end of the casing, said head having an axial bore, a main piston working in the casing, said main piston having an axial bore and a tubular piston rod extending through the bore of the head and arranged to be attached to the other of said elements, a pump piston working in the bore of the main piston and the tubular piston rod, said pump piston being linked to the cap, valve means arranged to admit atmospheric air into the tubular piston rod when the pump piston moves inwardly thereof and to cause such air to be trapped and compressed and the compressed air introduced into the cap end of the casing when the pump piston moves outwardly of the tubular piston rod, a sleeve surrounding the tubular piston rod, the lower end of the piston rod being provided with radial ports, piston rings on the main piston and ducts in the main piston directing the lubricant caught by the piston rings to flow into the space between the tubular piston rod and its sleeve and through the radial ports into the outer end of the tubular piston rod.

4. In a cushioning device for the purposes described, the combination of a cylindrical casing arranged to be attached to one of the two elements between which the cushioning device is to be operatively interposed, a cap closing one end of the casing, a detachable head closing the other end of the casing, said head having an axial bore, a main piston working in the casing and provided with an axial bore and with a tubular piston rod extending outwardly through the bore of the head, a pump piston working in the bore of the main piston and linked to the cap, valve means in the pump piston and in the tubular piston rod for introducing atmospheric air into the tubular piston rod and trapping it therein and for compressing the trapped air and admitting it into the chamber formed between the main piston and the head end of the casing, a flexible packing ring circumferentially mounted on the main piston, and means for forcing lubricant under pressure against the interior wall surface of said packing to render the packing flexible and outwardly expand the same.

5. The structure of claim 4 characterized by the provision of wells formed in the main piston to be filled with grease which is exposed to fluid pressure within the casing, and ducts leading from the wells to the interior wall surface of the packing.

ANNA M. COOK,
*Administratrix of Harry L. Cook, Deceased.*